UNITED STATES PATENT OFFICE.

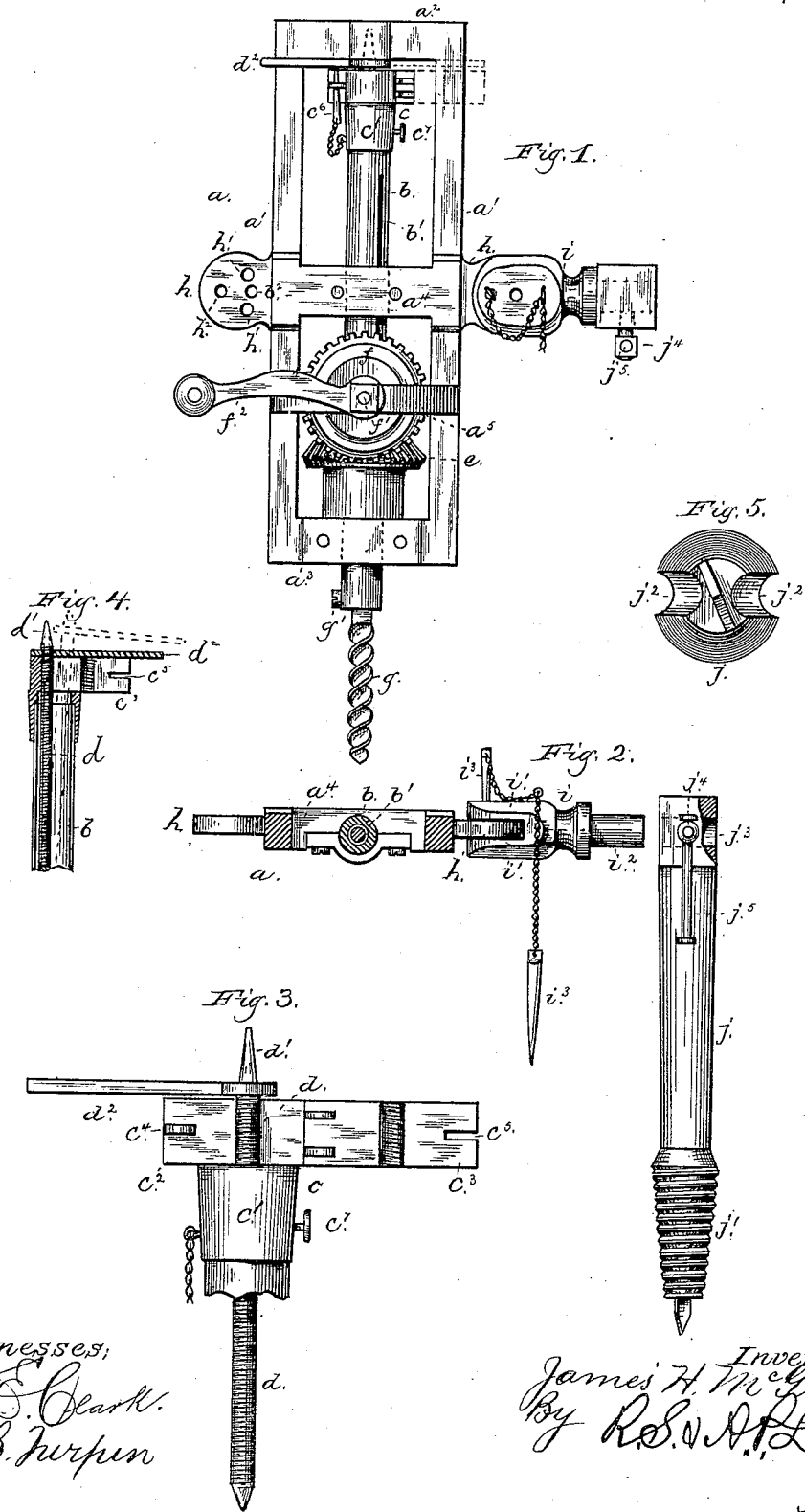

JAMES H. McGLYNN, OF WILKES-BARRÉ, PENNSYLVANIA.

ROCK-DRILLING MACHINE.

SPECIFICATION forming part of Letters Patent No. 267,441, dated November 14, 1882.

Application filed June 23, 1882. (Model.)

*To all whom it may concern:*

Be it known that I, JAMES H. McGLYNN, a citizen of the United States, residing at Wilkes-Barré, in the county of Luzerne and State of Pennsylvania, have invented certain new and useful Improvements in Coal and Rock Drills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in coal and rock drills; and it consists essentially in the manner of feeding and adjusting the drill, and in other improvements, as will be hereinafter fully described, and specifically pointed out in the claims.

In the drawings, Figure 1 is a side view of my machine. Fig. 2 is a transverse section of same. Fig. 3 is a detail view showing the feed mechanism. Fig. 4 is a sectional view on line $x\ x$, Fig. 3, and Fig 5 is an end view of the fulcrum or supporting-post, as will be described.

$a$ represents the framing carrying the drill and feed and operating mechanism. It is composed of the side bars, $a'\ a'$, the end bars, $a^2\ a^3$, and the cross-bar $a^4$, and the curved bracket $a^5$. The end bar $a^3$ and cross-bar $a^4$ are provided with suitable bearings for the drill-shaft, and the end bar $a^2$ is provided with a socket to receive the tang of the feed-screw, hereinafter described, the socket in bar $a^2$ and the bearings in bars $a^3\ a^4$ being in line with each other, as shown in dotted lines, Fig. 1.

$b$ represents the drill-shaft. It is constructed with a longitudinal groove, $b'$, nearly its full length, and it is journaled in the cross-bar $a^4$ and end bar $a^3$, and slides through its bearings in the said bars in the operation of the machine, as will be described.

$c$ represents the nut for the feed-screw. It is composed of the thimble $c'$ and the hinged wings $c^2\ c^3$, which form the split nut. These wings are threaded correspondingly to the threads of the feed-screw. From the wing $c$ I project the lug $c^4$, which is perforated to receive the pin $c^6$, and in the end of a wing, $c^3$, I cut the slot $c^5$. Hence when the parts are in the position shown in Fig. 3 I turn wing $c^2$, bringing the lug $c^4$ through slot $c^5$, and pass pin $c^6$ through perforation in lug $c^4$ above wing $c^3$, securing the wings together and forming substantially a solid nut. I construct these nuts $c$ with the thimble $c'$, arranged to fit over the end of shaft $b$, and secure it by set-screw $c^7$, as shown in Figs. 1 and 3, or in any other suitable manner desired, so it may be easily replaced by another nut of coarser or finer thread, as the feed-screw hereinafter described is changed to make the feed fast or slow, as is often desirable in drilling coal or rock.

$d$ is the feed-screw. It is constructed with the tang or shank $d'$ and the arm $d^2$. The arm $d^2$ is extended from the rear end of screw at right angles thereto, and arranged to engage the arms $a'$ of the framing, as shown in Fig. 1, and prevent the screws turning. When so desired this arm may be made separate from screw $d$ and secured thereto by set-screw, or in any other manner desired. The tang $d'$ is extended beyond the joint with the arm $d^2$ and in line with the screw, and it is arranged to be seated in the socket formed in end bar $a^2$. The threads of this screw, it will be understood, correspond to the threads employed in the nut $c$.

$e$ represents a bevel-gear wheel, which is secured on the shaft $b$ by a key which works in the groove $b$, thus permitting the shaft $b$ to slide through the said gear-wheel while it is being revolved thereby, as will be described.

$f$ represents a bevel-gear wheel, arranged to mesh with wheel $e$. The shaft $f'$ of wheel $f$ is journaled in the bracket $a^5$, as shown in Fig. 1, and is provided with a crank, $f^2$, whereby motion is given to the drill-shaft.

$g$ represents the drill, secured in end of shaft $b$ by set-screw $g'$. $h\ h$ are plates or lugs extended from the side arms, $a'$, of frame $a$, in the same plane with the said frame and in line with cross-bar $a^4$. These lugs are rounded on their outer ends, and they are perforated with openings $h'\ h'\ h^2\ h^2$, arranged in pairs, as will be described.

$i$ represents the rule-joint piece. It is composed of the parallel jaws $i'\ i'$ and the rounded shank $i^2$. The jaws $i'\ i'$ are adapted to fit over the lugs $h$, as shown in Fig. 2, and they are provided with a pair of openings corresponding to openings through the said lugs. $i^3\ i^3$ are pins connected by chains to piece $i$, and arranged to be passed down through openings in jaws $i'$ $i'$ and through the coincident holes in lugs $h$, as will be described.

$j$ is the supporting-post. It is provided at one end with threads, forming a screw, $j'$, which is screwed into the coal or rock, and this screw is formed with longitudinal channels $j^2$, to carry off the slack as the screw is turned into the coal. On the opposite end of the post I form an opening, $j^3$, to receive the shank $i^2$ of piece $i$, as shown in dotted lines, Figs. 1 and 2. $j^4$ is a set-screw, arranged to bear through threaded opening in post $j$ against the shank $i^2$ and secure it in position in the operation of the machine, as will be described. This set-screw is provided with a lever, $j^5$.

In the operation of my device I screw the supporting-post $j$ into the rock or coal near where it is desired to drill. This post is screwed sufficiently far into the coal or rock to provide a firm support for the drill-frame. The shank of joint-piece $i$ is then placed in opening $j^3$ and adjusted to the proper angle, and there secured by screw $j^4$. The lug $h$ on frame $a$ is then placed between the jaws $i'$ $i'$, and there secured by pins $i^3$, passed through the holes in the jaws $i'$ and through the holes $h'$ $h'$ or $h^2$ $h^2$, according as it is desired to adjust the frame $a$. Thus it will be seen the framing is easily adjusted, so that holes can be bored at any angle up or down without changing the supporting-post; also, that by changing the pins in the rule-joint the drill can be set in position to bore a hole at any desired angle or place, and that by reversing the rule-joint piece in the supporting-post the drill can be reversed, thus making it a right or left machine at will.

When the several parts of the drill are in the position shown in Fig. 1, and it is desired to drill a hole, the crank $f^2$ is revolved to the right, turning the wheels $f$ $e$ and shaft $b$, and the shaft having the nut $c$, turning on screw $d$, is fed with the drill into the rock or coal, the shaft sliding through the wheel $e$ by its connection therewith by means of key working in groove $b'$, as described. When the hole has been drilled a sufficient depth, or it is desired for any other reason to withdraw the drill, the motion of the crank is reversed, carrying the arm $d^2$ of feed-screw into position shown in dotted lines, Fig. 1, and the drill is drawn out of the hole. When the shaft has been run almost off the feed-screw in drilling a hole, and it is desired to begin again with a fresh feed, I obviate the necessity of turning the shaft back on the screw $d$ by simply unfastening the wings of nut, turn the wing $c^3$ back, and lift the screw into the position shown in dotted lines, Fig. 4, and push it up into the shaft and draw the shaft back, when the drill is again ready for work. It will be seen, also, that the arm $d^2$ on screw can be adjusted backward or forward, so that the slack in the bored hole can be drawn out by the drill without moving the supporting-post or drill-frame from their positions. My feed-screw, being contained within the hollow shaft, is protected at all times from dust and dirt.

Having thus described my invention, what I claim, and desire to secure by Letters Patent, is—

1. The combination, substantially as hereinbefore set forth, of the revolving tubular drill-shaft having its inner end open, the hinged nut fixed to the open tubular end of and revolving with the drill-shaft, and the stationary feed-screw having one end held in the supporting-frame and its other end extended through the hinged nut and into the tubular drill-shaft, substantially as set forth.

2. The combination, substantially as hereinbefore set forth, of the shaft $b$, carrying the drill and journaled in bearings in the frame $a$, the nut $c$, secured on the end of shaft $b$, and constructed with the hinged wings $c^2$ $c^3$, the non-rotating feed-screw $d$, passing into the shaft $b$, and constructed with the tang $d'$, seated in bearings in the end bar of frame $a$, and means for revolving the shaft $b$, as set forth.

3. The combination, substantially as hereinbefore set forth, of the frame $a$, provided with the lugs $h$ $h$, arranged on the opposite edges thereof, the arch or dome $a^5$, fixed to the frame $a$, the hollow drill-shaft $b$, provided with a nut, $c$, on its open end, the pinion $e$, sleeved upon the drill-shaft, the gear $f$, journaled in the dome or arch $a^5$ and meshing with the pinion $e$, the feed-screw having one of its ends held in the frame $a$ and its other end working in the drill-shaft, and means for holding the frame and drill at any desired angle, as set forth.

In testimony whereof I affix my signature in presence of two witnesses.

JAMES H. McGLYNN.

Witnesses:
M. E. GAUGHAN,
W. S. PARSONS.